Figure 1:
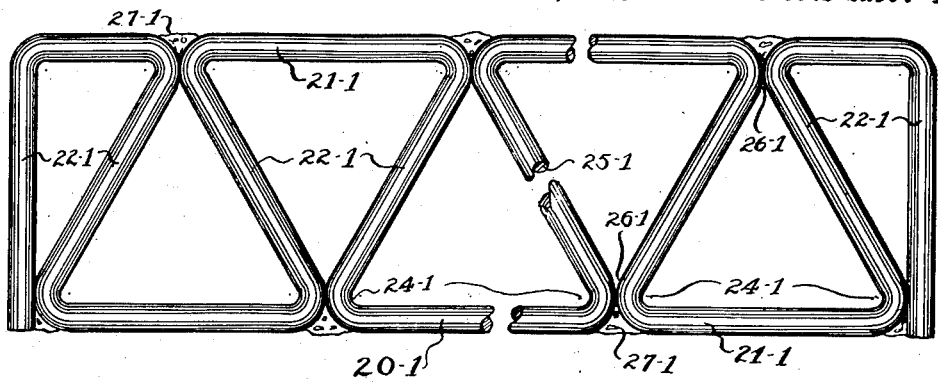

Feb. 17, 1925.  
G. H. DAWSON ET AL  
1,526,463  
TRUSSED STRUCTURE  
Filed Nov. 26, 1923  
4 Sheets-Sheet 1

Inventors  
George Hives Dawson  
Hurxthal Field Frease  
By Freass and Bond  
Attorneys Feb. 17. 1925.    1,526,463
G. H. DAWSON ET AL
TRUSSED STRUCTURE
Filed Nov. 26, 1923    4 Sheets-Sheet 4
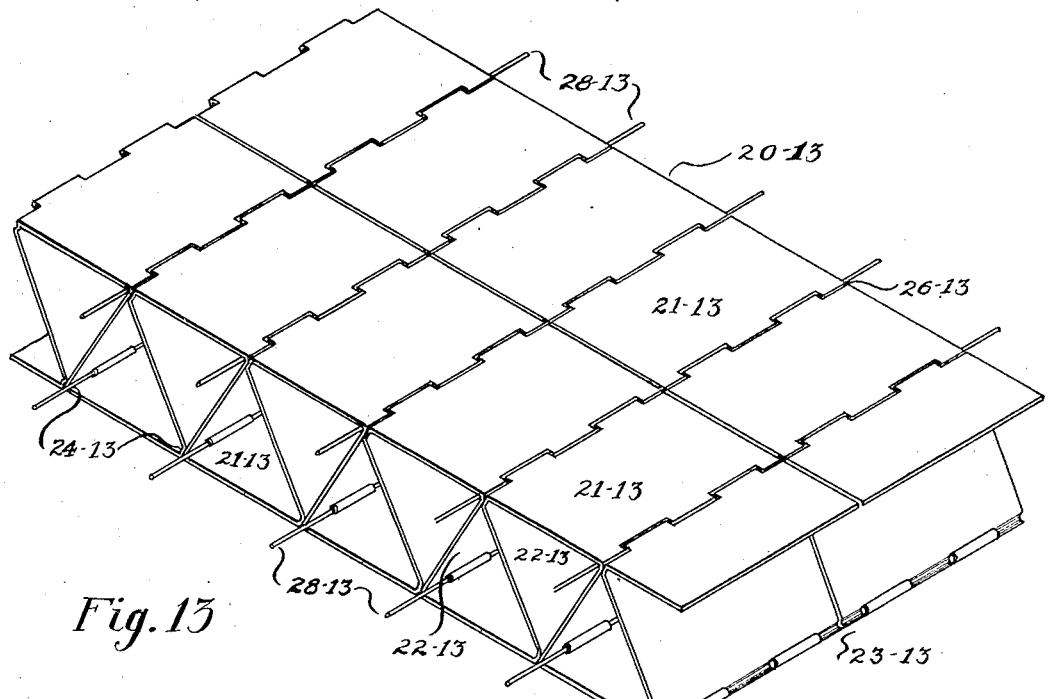
Fig.13
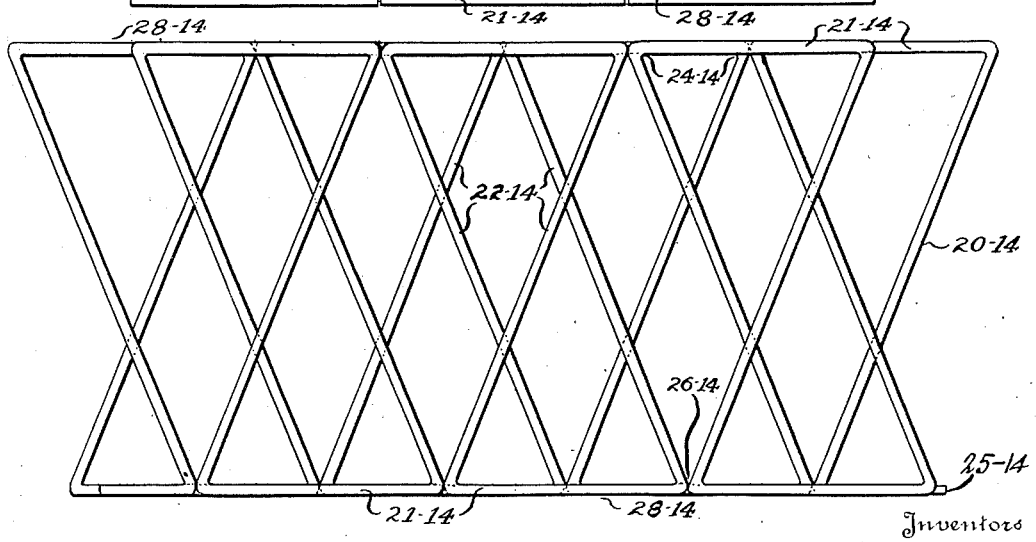
Fig.14
Fig.15
Inventors
George Hives Dawson
Hurxthal Field Frease
By Frease and Bond
Attorneys Patented Feb. 17, 1925.

1,526,463

UNITED STATES PATENT OFFICE.

GEORGE HIVES DAWSON AND HURXTHAL FIELD FREASE, OF BOSTON, MASSACHUSETTS.

TRUSSED STRUCTURE.

Application filed November 26, 1923. Serial No. 676,897.

*To all whom it may concern:*

Be it known that we, GEORGE HIVES DAWSON and HURXTHAL FIELD FREASE, citizens of the United States, residing at Boston, in the county of Suffolk and State of Massachusetts, have invented new and useful Improvements in Trussed Structures, of which the following is a specification.

The invention relates to trussed structures having spaced chord members and connecting web members joined together. Ordinarily such chord and web members are separate pieces which must be made to size and assembled to form the completed trussed structure. In the manufacture of even a simple trussed girder of substantial length, while the equivalent of a large number of chord members is attained by the use of two or more strips of the total length of the girder, yet there are still a large number of separate web members each of which must be made and punched to size and each of which must be properly assembled and fastened usually by means of rivets to the continuous equivalents of a large number of chord members. In the manufacture of such a girder the number of separate members each of which must be made to size and assembled often runs to several hundred. Due to the fact that most of these members must be fastened at each end to the co-operating members in the structure or the equivalents thereof, the number of chances for manufacturing and assembling errors, for two ended members, is double the number of members or equivalents to be assembled. Moreover in such an assembled trussed structure unequal strains and stresses are often set up in individual members due to the fact that it has been found to be a practical impossibility accurately to space and secure the fastening means which tie the truss members together at the joints.

The objects of the present invention seek to economize the manufacture of trussed structures by reducing the number of parts to be made and assembled to one or two in the case of a simple girder, and to overcome unequal strains and stresses due to erection inaccuracies, by a pre-assembly formation of the truss from a single strip of material, and are as follows:

First, to provide a trussed element having spaced chord and web members made from a continuous strip of material shaped and fastened at the truss joints to form a trussed structure;

Second, to provide a trussed structure having a trussed element comprising spaced chord members and web members joined together made from a continuous strip of material, the chord members being reinforced by continuous flange strips when desired;

Third, to provide a trussed structure comprising a plurality of assembled trussed elements;

Fourth, to provide a trussed structure capable of having any desired conformation of continuous chord and web members; and Fifth, to provide a trussed structure adapted to convenient assembly by the use of welding.

Several practical means of attaining these objects are illustrated by the accompanying drawings, in which—

Figure 2:
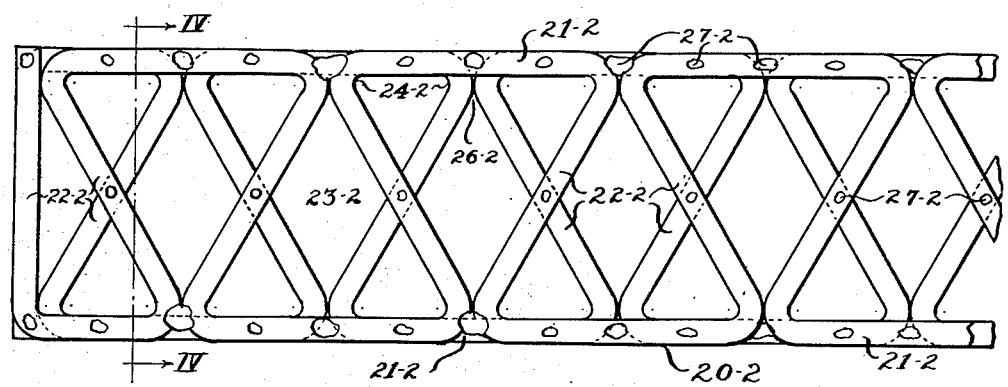
Figure 3:
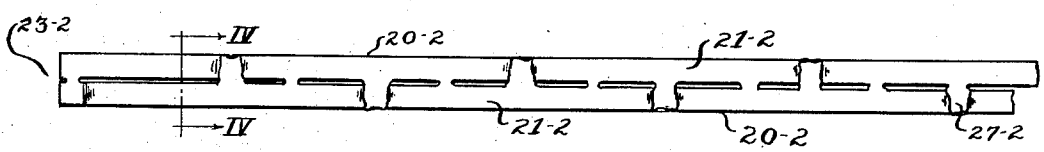
Figure 4:
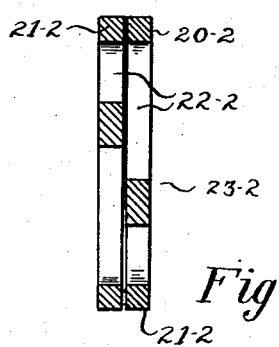
Figures 5, 6:
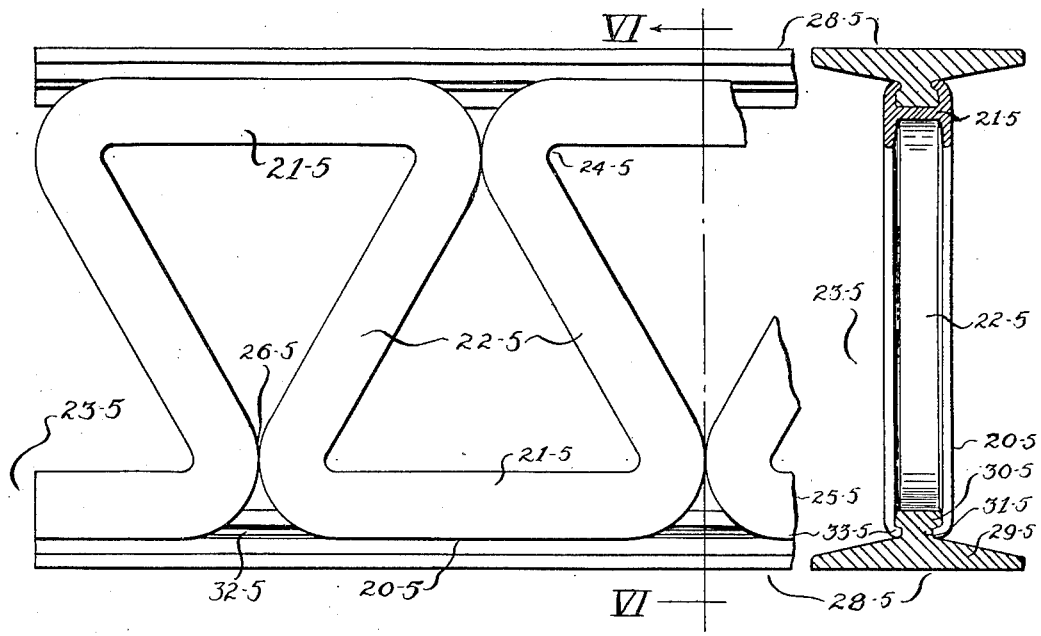
Figures 7, 8:
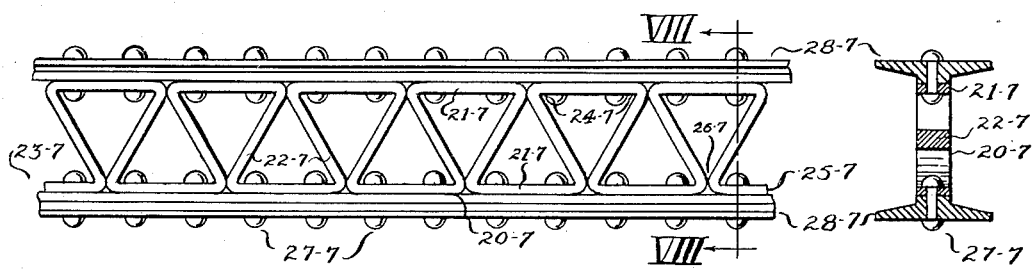
Figure 9:
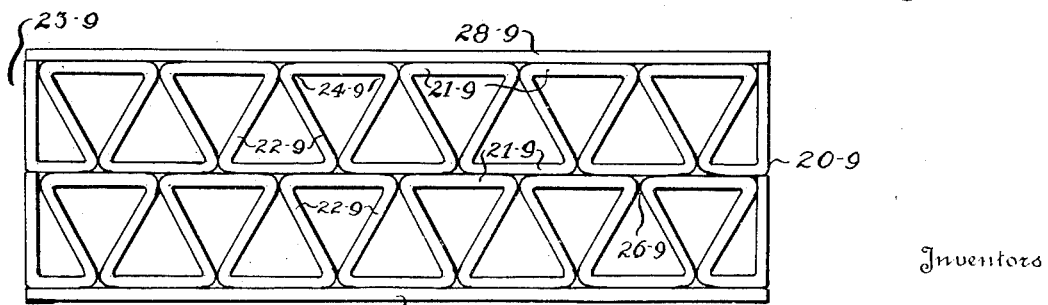
Figure 10:
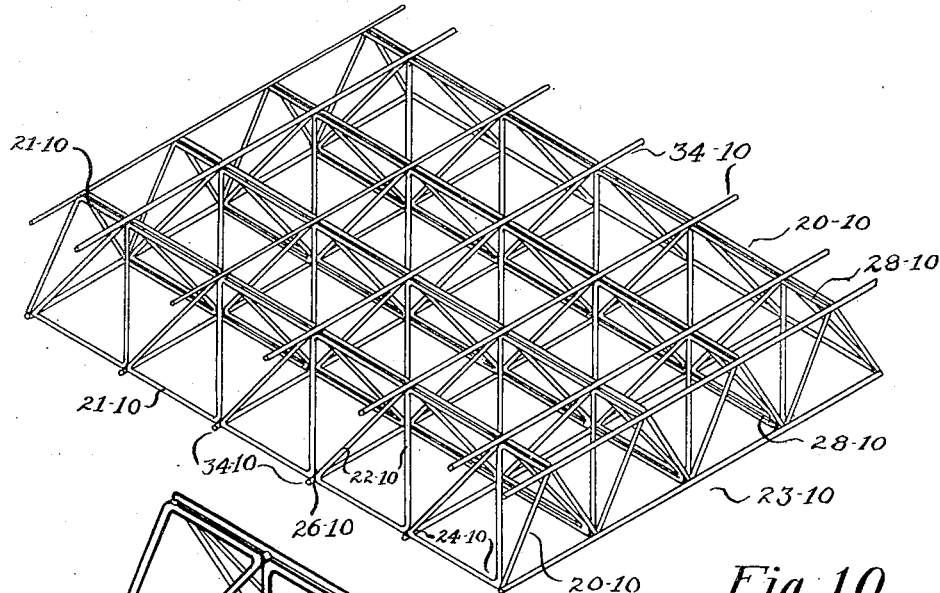
Figure 11:
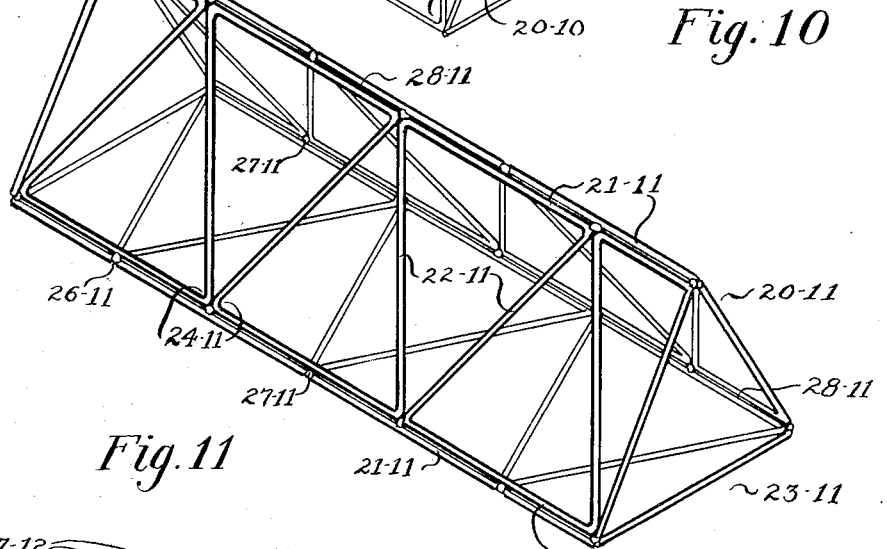
Figure 12:
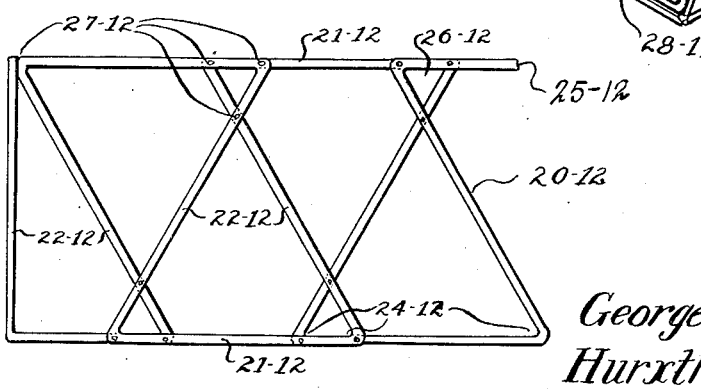

Figure 1 is a fragmentary elevation of a trussed element;

Fig. 2, a fragmentary elevation of a trussed structure made up of two trussed elements;

Fig. 3, a top plan view of the same;

Fig. 4, a cross-section of the same, as at IV—IV, Figs. 2 and 3;

Fig. 5, a fragmentary elevation of a trussed structure comprising a trussed element and chord reinforcing strips;

Fig. 6, a cross-section of the same, as at VI—VI, Fig. 5;

Fig. 7, a fragmentary elevation of another type of trussed structure comprising a trussed element, and chord reinforcing;

Fig. 8, a cross-section of the same, as at VIII—VIII, Fig. 7;

Fig. 9, a view which may be either an elevation or a plan view of a trussed structure comprising a plurality of trussed elements; and suitable chord reinforcing;

Fig. 10, an isometric view of a trussed panel structure comprising a plurality of trussed elements and suitable cross reinforcing strips;

Fig. 11, an isometric view of a polygonal trussed structure comprising a plurality of trussed elements;

Fig. 12, an elevation of a particular type of trussed element adapted for use as a joist, or concrete reinforcing, and made from a single continuous strip of material;

Fig. 13, an isometric view of a trussed structure comprising a plurality of trussed element made from sheet material and provided with suitable fastening means;

Fig. 14, a fragmentary elevation of a trussed structure made from a continuous strip of material and having the cross-sectional area of any chord member double the cross-sectional area of any web member; and Fig. 15, a top plan view of the same.

While the continuous material used to form any of the various types of trussed elements of the present invention may be of any desired substance; for most practical purposes a continuous metallic material adapts itself easily to the necessary forming operations, and to assembly by the use of any desired fastening means such as riveting, welding, or mechanical means such as the type illustrated in Fig. 13.

Morever, the sheet material shown in Fig. 13, formed into trussed elements, and fastened by loops and rods, may be unperforated, as shown, or may be perforated, or may be made of metal lath or expanded metal of any desired type.

Similar numerals refer to similar parts throughout the several views.

The various improved trussed elements, 20—1, 20—2, 20—5, 20—7, 20—9, 20—10, 20—11, 20—12, 20—13, and 20—14 shown, respectively, in Figs. 1; 2, 3 and 4; 5 and 6; 7 and 8; 9; 10; 11; 12; 13; and 14 and 15; comprise, respectively, spaced chord members of various cross-sections 21—1, 21—2, 21—5, 21—7, 21—9, 21—10, 21—11, 21—12, 21—13, and 21—14, and connecting web members 22—1, 22—2, 22—5, 22—7, 22—9, 22—10, 22—11, 22—12, 22—13, and 22—14, respectively, alternating with, and continuous with, the chord members.

Trussed elements 20—1, 20—12, 20—13, and 20—14, as well as all the other elements, are in themselves trussed structures made from continuous strips of materials assembled and fastened by any convenient means presently to be described.

The trussed structures 23—2, 23—5, 23—7, 23—9, 23—10, and 23—11, as well as the whole trussed structure 23—13, are made up, respectively, of pluralities of trussed elements 20—2, 20—5, 20—7, 20—9, 20—10, 20—11, and 20—13, assembled and fastened by any convenient means also presently to be described.

In general the fastening of any assembled product is achieved in one of three ways; namely, (1) mechanical manipulation of the assembled members; (2) the use of a positive fastener such as a bolt, screw, rivet, or eyelet; and (3) the use of some type of welding, such as electric arc, butt, spot, or flash, or the acetylene flame.

Examples of each of these three broad types of fastening means for the trussed structures of the present invention are specifically illustrated in the drawings, and will be described and enumerated in connection with a detailed discussion of each of the various types of trussed structure shown.

In the case of Figs. 9, 10, 11, and 14, some form of welding not shown in every instance is the fastening means.

The peculiar characteristics of each of the various modifications of trussed elements or structures shown will now be considered.

Fig. 1, as aforementioned, illustrates a simple form of trussed element 20—1 having spaced chord members 21—1 and connecting web members 22—1. As may be seen from an inspection of the drawing, going from left to right, the whole trussed element has been formed by bending at apexes 24—1 a continuous cylindrical wire or rod 25—1 so that the web members 22—1 alternate with, and are continuous with, the chord members 21—1. Obviously the bending of the wire at the apexes may be done in one or several operations. To form the completed trussed element, however, apexes 24—1 must be made to abut with each other to make joints 26—1, which joints are shown in Fig. 1 to be fastened by welds 27—1, although some other joint fastening means might have been used.

The trussed element 20—1 of Fig. 1, is in itself a trussed structure, and may be used as such wherever desired; for instance as a joist or as reinforcing for concrete construction.

Variations in the dimensions of, and in the methods of assembling this fundamental trussed element are many. Some of the possible variations are illustrated in Figs. 2 to 15, inclusive.

While the fundamental element 20—1, and any of variations, may be used as trussed structures when the respective apexes 24—1, 24—2, 24—5, 24—7, 24—9, 24—10, 24—11, 24—12, 24—13, and 24—14, are abutted or otherwise brought together to form joints 26—1, 26—2, 26—5, 26—7, 26—9, 26—10, 26—11, 26—12, 26—13, and 26—14, respectively, and suitably fastened; yet it is often desirable to provide for greater strength against bending in the trussed structures by introducing more material into the chord members as shown in Figs. 5 to 8 inclusive, or by reinforcing the web members as well as the chord members as shown in Fig. 9, or by otherwise combining a plurality of trussed elements to form the plane trussed structure shown in Fig. 2, the panel trussed structure shown in Fig. 10, or the polygonal trussed structure shown in Fig. 11.

Before dealing with the structures having chord reinforcing, or those made up of a plurality of trussed elements, a word may be said about the elements, or structures, shown in Figs. 12, and 14 and 15.

The trussed element, or structure, 20—12 shown in Fig. 12, comprises the usual web members 22—12 alternating with the usual chord members 21—12 and continuous therewith, a continuous rod 25—12 having been bent at apexes 24—12. Instead of abutting the apexes as in the case of the simple element 20—1, the apexes have been overlapped to form a plural joint 26—12. This overlapping of apexes provides easily for spot-welds 27—12; while the plural joints 26—12 are themselves small triangular trusses which not only strengthen the whole structure but provide also convenient points for wiring or otherwise fastening other material to the chord members 21—12.

The trussed element, or structure, 20—14 is assembled by carrying on the operations described for the making of element 20—12, the only exception being that the apexes 24—14 have been overlapped to a greater extent. In the element 20—14 apexes on the same row of chord members, as at 28—14, Figs. 14 and 15, have been overlapped to such an extent that alternate opposing apexes abut each other at joints 26—14, thus providing for convenient spot-welded fastenings not shown, and for chord members having double the cross sectional area of any member, all from a single continuous wire or rod 25—14.

Figs. 2, 3, and 4, illustrate a trussed structure 23—2 made up of two similar trussed elements 20—2 having chord members 21—2, web members 22—2, apexes 24—2, and abutted joints 26—2, each element being made from a continuous square wire or rod.

The structure 23—2 is assembled as shown so that one element is directly superposed upon the other in such a way that the joints 26—2 of one element lie midway between the joints 26—2 of the other element. By this method of assembling, welded fastenings 27—2 may be used not only for the chord members but also for the web intersections, and the apexes of a single element are welded not only to each other to form the fastened joints, but also to the side by side chord members of the superposed element. Thus a very strong and easily assembled trussed structure may be made from but two separate parts.

In Figs. 5 and 6, the trussed element 20—5 has been made from a continuous strip of material 25—5 having an I cross-section as shown in Fig. 6. As in the case of all the other elements the element 20—5 has chord members 21—5, web members 22—5, apexes 24—5, and joints 26—5 all comprised in a single continuous strip. Continuous chord or flange reinforcing strips 28—5 have been provided to give the structure greater strength against bending. These flange strips 28—5 comprise in integral pieces base flanges 29—5, tongues 30—5, and necks 31—5, thus providing neck grooves 32—5. The completed trussed structure 23—5 is assembled by bending and wedging the proper flanges 33—5 of the strip 25—5 about the tongues 30—5 and into the neck grooves 32—5 as shown most clearly in Fig. 6.

In Figs. 7 and 8, a reinforced trussed structure 23—7 is illustrated which comprises a trussed element 20—7 made from a continuous "flat" 25—7, and flange or chord reinforcing strips 28—7 which have been fastened to the element 20—7 by rivets 27—7 as shown. The element 20—7 itself comprises in a single continuous strip chord members 21—7, web members 22—7, apexes 24—7, and joints 26—7.

In Fig. 9, a trussed structure 23—9 is shown which comprises abutting trussed elements 20—9 and flange reinforcing strips 28—9, the elements having the usual chord members 21—9, web members 22—9, apexes 24—9, and joints 26—9, all parts of single continuous strips. The cross-section of the continuous strips forming the elements may have any desired outline. The peculiar characteristic worthy of note in connection with the structure 23—9 is the method of assembling the abutting elements so that the joints 26—9 of one element lie midway between the joints 26—9 of the other element and alongside the chord elements 21—9 thereof. This is similar to the method described for the structure shown in Figs. 2 and 3. In fact if one of the elements of Figs. 2 and 3, be imagined to have been revolved about one double row of chord members one hundred and eighty degrees, the resulting structure would be similar to that shown in Fig. 9, where of course the two assembled elements lie in the same plane.

For the purpose of making gratings or the like, more than two co-planar elements may be assembled according to the method illustrated in Fig. 9. This method of assembly adapts itself particularly to the use of welding not shown for making the necessary joint fastenings. Thus any two abutting apexes may be welded to each other and to the respective abutting chord members in one operation.

In the structure 23—10 shown in Fig. 10, a plurality of elements 20—10 have been assembled to form a panel trussed structure which may be used as a floor or roof supporting or reinforcing panel. Here again each of the elements 20—10 consists of a continuous strip of material shaped to form chord members 21—10, web members 22—10, abutting apexes 24—10, and joints 26—10. A plurality of elements have been assembled so that the chord members and joints of one element abut and register with the chord members and joints of the next element to form alternately disposed rows of chord flanges 28—10. The planes of the joined elements are alternately disposed at angles with each other so that a saw-tooth profile is attained as illustrated in Fig. 10 wherein every alternate flange 28—10 may be considered to be a peak of the saw-tooth profile. The rigid structure 23—10 is completed by the use of cross-members 34—10, which may be fastened by any known means not shown to the joints 26—10 of the flanges 28—10.

In Fig. 11, a trussed structure 23—11 is shown which comprises three trussed elements 20—11 assembled to form a closed triangular structure having three flange members 28—11. As before each trussed element itself comprises chord members 21—11, web members 22—11, apexes 24—11, and joints 26—11, all parts of the same continuous strip of material. The flange members 28—11 consist of abutted and joined rows of chord members of successive trussed elements. In this case the joints of one element lie midway between the joints of the abutting element alongside the chord members thereof, thus adapting the formation to fastening by the use of welds 27—11 which unite abutting apexes and chord members.

The structure 23—13 shown in Fig. 13 is similar in purpose to that shown in Fig. 10, and comprises a plurality of trussed elements 20—13. In this case, however, the trussed elements are formed from continuous sheet material of any type desired, and include spaced chord members 21—13, connecting web members 22—13, apexes 24—13, and lapped loops 26—13. The trusses are completed by passing connecting and reinforcing rods 28—13 through the lapped loops as shown. The rods 28—13 may be long enough to assemble as shown a plurality of trussed sheet elements to form a trussed panel structure.

While the drawings illustrate in all cases a parallel disposition of the spaced chord members of the various trussed structures shown, obviously, the present invention may be applied to trussed structures having non-parallel disposition of spaced chord members by a mere variation in the longitudinal dimensions of the alternating chord and web member portions of the continuous strip material used in forming the trussed structures.

We claim:

1. A trussed element formed from a continuous strip and comprising spaced rows of chord members and connecting web members, there being junction angles between the chord and web members and means fastening the chord and web members to each other at the junction angles.

2. A trussed element comprising spaced chord members and connecting web members, all of the members being portions of a continuous strip bent and abutted at apexes of the bends to form alternating chord and web members, there being means fastening the chord and web members to each other at the abutting apexes.

3. A trussed element including spaced rows of chord members and web members joined to each other, all the members being formed from a single continuous strip.

4. A trussed element formed from a single continuous strip having alternate chord member portions and web member portions with apexes between the chord portions and the web portions, there being means fastening the chord and web member portions to each other at the apexes.

5. A trussed element formed from a single continuous strip of material, comprising spaced chord members, and alternating and connecting web members, there being opposing apexes between the chord and web members and means fastening the chord and web members to each other at the opposing apexes.

In testimony that we claim the foregoing, we have hereunto set our hands.

GEORGE HIVES DAWSON.
HURXTHAL FIELD FREASE.